F. ZALJS.
NUTCRACKER.
APPLICATION FILED SEPT. 16, 1918.

1,312,149. Patented Aug. 5, 1919.

INVENTOR
Frank Zaljs.
BY Oscar Geier
his ATTORNEY

UNITED STATES PATENT OFFICE.

FRANK ZALJS, OF CHESTER, PENNSYLVANIA.

NUTCRACKER.

1,312,149.　　　　Specification of Letters Patent.　　Patented Aug. 5, 1919.

Application filed September 16, 1918.　Serial No. 254,263.

*To all whom it may concern:*

Be it known that I, FRANK ZALJS, a citizen of Russia, residing at Chester, county of Delaware, and State of Pennsylvania, have invented certain new and useful Improvements in Nutcrackers, of which the following is a specification.

This invention relates to improvements in nut crackers, and has as its special object the provision of a simple and inexpensive device by which nuts of variable types may be readily and easily cracked.

A further object is to provide a nut cracker which may be folded into a very compact compass so as to be conveniently carried in the pocket of a garment.

These and other like objects are attained by the novel construction and combination of parts hereinafter described and shown in the accompanying drawing, forming a material part of this disclosure, and in which:—

Figure 1:
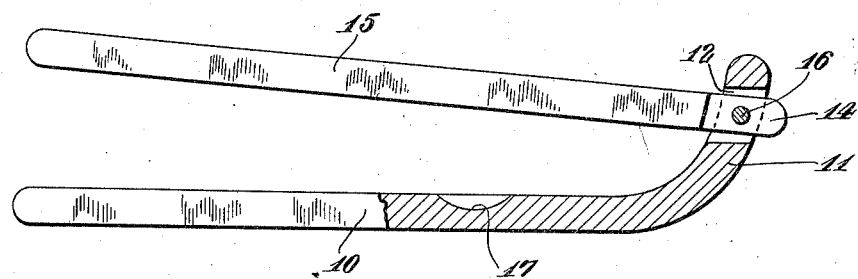
Figure 1 is a side elevational view showing a plain form of a nut cracker, parts being in section in order to show the joint construction.

In the simple form shown in Fig. 1, a handle lever 10 is formed with an angularly bent portion 11, having an opening 12, receptive of the reduced end 14 of the mating lever 15, the two being pivotally connected by a pin 16, and the lower lever 10 having a recess 17, adapted to receive a portion of the shell of the nut to be cracked.

Figure 2:
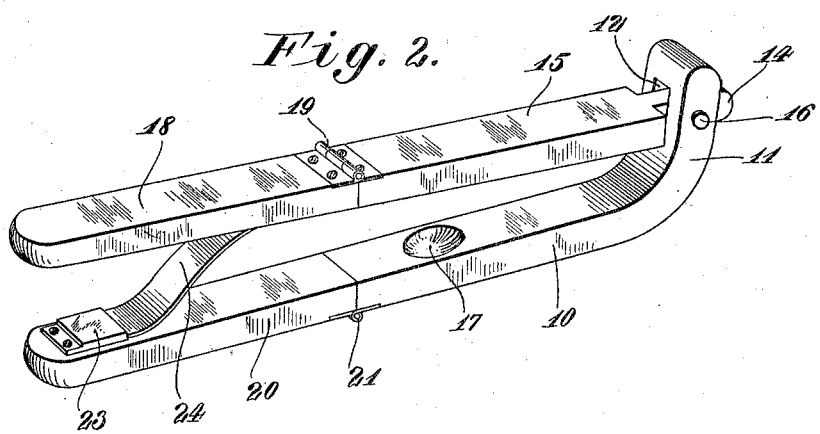
Fig. 2 is a perspective view showing a preferred form of nut cracker extended as in an operative position.
Figure 3:
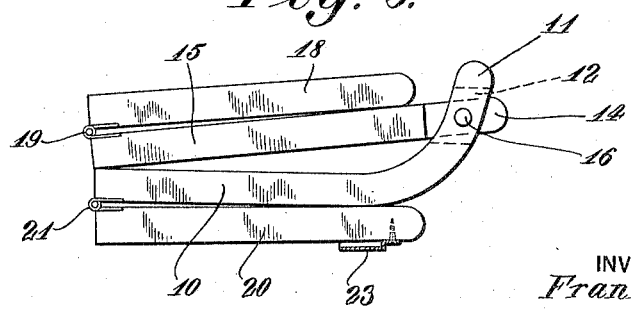
Fig. 3 is a side elevational view of the same, shown in a folded or collapsed position.

In the modified form shown in Fig. 2, the upper lever 15 has joined to it an extending handle 18, connected by the hinge 19, the lower lever 10 being similarly engaged with an extending handle 20 secured by the hinge 21.

Rigidly secured upon the upper portion of the handle 20 is a clip socket 23, in which is engageable the lower end of a bent flat spring 24 adapted, when the instrument is operated to press the handles apart permitting the ready entrance of a nut into the recess 17.

From the foregoing it will be seen that a practical implement has been disclosed, the preferred form of which is capable of being compactly folded for transportation or storage.

Having thus described my invention what I claim as new and desire to secure by Letters Patent, is.

In a nut cracker, the combination with a lever having an angularly turned end, a second lever pivoted in said end, a recess formed in the upper surface of the first named lever adapted to receive a nut to be cracked, a pair of handles extending outwardly from said levers, hinges connecting between said handles and said levers, a clip containing a socket secured to one of said handles, and a bent flat spring engageable within the socket of said clip adapted to press said handles normally apart.

In testimony whereof I have affixed my signature.

FRANK ZALJS.

Copies of this patent may be obtained for five cents each, by addressing the "Commissioner of Patents, Washington, D. C."